(12) United States Patent
Kardos et al.

(10) Patent No.: US 9,062,593 B2
(45) Date of Patent: Jun. 23, 2015

(54) ARRANGEMENT FOR CONVERTING THERMAL ENERGY TO MECHANICAL ENERGY IN A VEHICLE

(75) Inventors: Zoltan Kardos, Södertälje (SE); Ola Hall, Stockholm (SE)

(73) Assignee: SCANIA CV AB (SE)

( * ) Notice: Subject to any disclaimer, the term of this patent is extended or adjusted under 35 U.S.C. 154(b) by 125 days.

(21) Appl. No.: 14/002,540

(22) PCT Filed: Mar. 6, 2012

(86) PCT No.: PCT/SE2012/050250
§ 371 (c)(1),
(2), (4) Date: Aug. 30, 2013

(87) PCT Pub. No.: WO2012/125107
PCT Pub. Date: Sep. 20, 2012

(65) Prior Publication Data
US 2013/0333380 A1 Dec. 19, 2013

(30) Foreign Application Priority Data

Mar. 17, 2011 (SE) .................................. 1150235

(51) Int. Cl.
*F02B 33/44* (2006.01)
*F02B 37/00* (2006.01)
(Continued)

(52) U.S. Cl.
CPC ................ *F02B 37/00* (2013.01); *B60W 10/06* (2013.01); *B60W 10/30* (2013.01); *B60W 30/188* (2013.01);
(Continued)

(58) Field of Classification Search
CPC ......... B60T 1/10; B60W 10/06; B60W 10/30; B60W 30/188; B60W 30/1882; B60W 30/1886; F01K 23/065; F01K 23/101; F01P 3/20; F02B 37/00
USPC ............................. 123/559.1–566, 200–249
See application file for complete search history.

(56) References Cited

U.S. PATENT DOCUMENTS 4,132,283 A * 1/1979 McCurry ...................... 180/165
5,549,174 A * 8/1996 Reis .............................. 180/165
(Continued)

FOREIGN PATENT DOCUMENTS

EP          0 645 272 A1     9/1994
KR        2009 0061995       6/2009
(Continued)

OTHER PUBLICATIONS

International Search Report dated Jun. 25, 2012 issued in corresponding International patent application No. PCT/SE2012/050250.

*Primary Examiner* — Jesse Bogue
(74) *Attorney, Agent, or Firm* — Ostrolenk Faber LLP

(57) ABSTRACT

An arrangement for converting thermal energy to mechanical energy in a vehicle (1). A working medium is vaporized by a heat source (3) in the vehicle (1) and is thereafter expanded through a turbine (13) generating mechanical energy. A control unit (31) receives information indicating the vehicle (1) is to be braked and connects the cooling system (21, 39) of the vehicle to the vehicle's power train (2, 5-9) to cool a refrigerant to a low temperature. The control unit (31) receives information that the vehicle (1) requires extra propulsive force and, uses the cooled refrigerant to subject the working medium in the line circuit (10) to a second step of cooling before it is led to the evaporator (12). The condensation temperature of the working medium may thus be lowered and more mechanical energy may be generated in the turbine (13).

10 Claims, 2 Drawing Sheets

(51) Int. Cl.
*B60W 30/188* (2012.01)
*B60T 1/10* (2006.01)
*F01K 23/06* (2006.01)
*F01K 23/10* (2006.01)
*B60W 10/06* (2006.01)
*B60W 10/30* (2006.01)
*F01P 3/20* (2006.01)

(52) U.S. Cl.
CPC ........ *B60W 30/1882* (2013.01); *B60W 30/1886* (2013.01); *B60T 1/10* (2013.01); *F01K 23/065* (2013.01); *F01K 23/101* (2013.01); *F01P 3/20* (2013.01)

(56) References Cited

U.S. PATENT DOCUMENTS

| | | | |
|---|---|---|---|
| 7,056,251 B2 * | 6/2006 | Ibaraki | 475/5 |
| 8,302,720 B2 * | 11/2012 | Rose et al. | 180/167 |
| 2004/0255593 A1 * | 12/2004 | Brasz et al. | 60/772 |
| 2006/0225421 A1 * | 10/2006 | Yamanaka et al. | 60/645 |
| 2010/0133031 A1 * | 6/2010 | Mendler | 180/165 |

FOREIGN PATENT DOCUMENTS

| | | |
|---|---|---|
| WO | WO 2008/035788 A1 | 3/2008 |
| WO | WO 2008 153670 A2 | 12/2008 |

* cited by examiner

ARRANGEMENT FOR CONVERTING THERMAL ENERGY TO MECHANICAL ENERGY IN A VEHICLE

CROSS-REFERENCE TO RELATED APPLICATIONS

The present application is a 35 U.S.C. §§371 national phase conversion of PCT/SE2012/050250, filed Mar. 6, 2012, which claims priority of Swedish Application No. 1150235-8, filed Mar. 17, 2011, the contents of which are incorporated by reference herein. The PCT International Application was published in the English language.

BACKGROUND TO THE INVENTION AND PRIOR ART

The present invention relates to an arrangement for converting thermal energy to mechanical energy in a vehicle.

When fuel is burnt in a combustion engine, chemical energy is converted to mechanical energy. A substantial part of the chemical energy is not converted to mechanical energy but to thermal energy which is released to the surroundings in various ways. An example of this is the thermal energy in the exhaust gases which are discharged to surrounding air. A known practice is to use WHR (waste heat recovery) systems in vehicles to capture thermal energy and convert it to mechanical energy. A WHR system comprises a pump which circulates a working medium in a line circuit. The line circuit comprises an evaporator in which the working medium is warmed so that it is vaporised and extra-heated by means of a heat source which may with advantage be exhaust gases from a combustion engine, and a turbine which is driven by the extra-heated gaseous working medium. When the working medium expands through the turbine, part of its thermal energy is converted to mechanical energy which may be used for immediate operation of the vehicle or be converted to and stored as electrical energy.

A known practice where a heavy vehicle is travelling on a long downhill run is to use an automatic braking process which gives the vehicle a constant speed downhill by activation of one or more supplementary brakes. The supplementary brakes may be retarders, exhaust brakes or compression brakes. To activate the automatic braking process, the vehicle is given a desired speed, followed by the driver operating the vehicle's brake pedal, a button or a suitable lever to initiate activation of the braking process. An electrical control unit controls the braking process so that the vehicle maintains the desired speed all the way down the hill. Using supplementary brakes for this braking process saves unnecessary wear on the vehicle's wheel brakes and eliminates the risk of their overheating. The braking process ends when the driver activates the vehicle's accelerator pedal or clutch pedal. The thermal energy generated when a supplementary brake, e.g. a hydraulic retarder, is activated is cooled away by the engine's cooling system. The engine's cooling system will be under heavy load when a hydraulic retarder is activated, and long hills may entail risk of overheating the coolant in the cooling system.

SUMMARY OF THE INVENTION

The object of the present invention is to propose an arrangement which with high efficiency converts thermal energy to mechanical energy in a vehicle.

A vehicle's power train extends from the engine to the powered wheels via a clutch and a number of motion-transmitting components. When the clutch is engaged, the power train runs as a unit. When the accelerator pedal is released with the clutch engaged, the power train will therefore run as long as the vehicle is in motion. At times when the vehicle has to be braked, a cooling system is connected to the power train. Operation of the cooling system counteracts the power train's motion so that the vehicle is braked. The cooling system serves in this case as a supplementary brake. Using a cooling system as a supplementary brake makes it possible for a large part of the energy evolved in braking to be used for cooling a refrigerant in the vehicle. In cooling systems where cold is created by supply of energy, the working medium may be cooled to a lower temperature than that of the surroundings.

The arrangement comprises substantially the same components as a conventional WHR system in a vehicle. A conventional WHR system can produce mechanical energy from a working medium which is warmed by a heat source so that it vaporises and is extra-heated. The working medium is then expanded in a turbine so that mechanical energy is created. The amount of mechanical energy which can be created in such a system depends mainly on the temperature to which the working medium is extra-heated in the evaporator and on the condensation temperature which the working medium assumes when it condenses in a condenser in the system. According to the invention, at times when the vehicle requires extra propulsive force, the cold refrigerant is used to cool the working medium after it has been cooled in the system's condenser. This combines with suitable adjustment of the amount of working medium in the line circuit to cause the working medium to assume a lower condensation temperature. This leads to the possibility of a larger amount of mechanical energy being created in the turbine at times when the vehicle requires extra propulsive force. The arrangement may for example recover and store brake energy when the vehicle is travelling downhill, and use this energy when travelling uphill. The arrangement thus achieves greater efficiency than a conventional WHR system in which the vehicle's braking energy is not recovered.

According to the present invention, the arrangement comprises a space for storing the refrigerant when it has been cooled by the cooling system. This space may with advantage be thermally insulated to enable the refrigerant to maintain its low temperature. The lower the temperature of the refrigerant, the more effectively it can lower the condensation temperature of the working medium in the line circuit and increase the production of mechanical energy in the turbine. The arrangement may comprise a heat exchanger situated at a location downstream of the condenser in the line circuit, a refrigerant circuit which has an extent between the storage space and the heat exchanger, and a pump adapted to being activated by the control unit to circulate the refrigerant from the storage space to the heat exchanger in which it cools the working medium at times when the vehicle is to be braked. In this case the cold refrigerant is led from the storage space to a heat exchanger, in which it subjects the working medium to an extra step of cooling. The refrigerant circuit then leads the refrigerant back to the storage space. Alternatively, the arrangement may comprise a valve situated at a location downstream of the condenser in the line circuit and an extra line loop which has an extent between the valve and the storage space, in which case the control unit is adapted to putting the valve into a position whereby the working medium is led from the valve to the storage space, in which it is cooled by the cold refrigerant at times when the vehicle is to be provided with extra propulsive force. When it has undergone an extra step of cooling by the refrigerant, the working medium is led back to the line circuit at a location upstream of the evaporator.

According to an embodiment of the invention, the refrigerant takes the form of a mixture of water and glycol. Mixing water and glycol in suitable amounts makes it possible to obtain a coolant which has a very low freezing temperature. Such a coolant mixture can be cooled to a temperature far below 0° C. without freezing. Alternatively, the refrigerant may take the form of material which has the characteristic of changing phase from liquid state to solid state in the storage space when it is cooled by the cooling system. Large amounts of thermal energy may be stored in phase-convertible material. This means that relatively small amounts of refrigerant will effect good cooling of the working medium when it undergoes the extra step of cooling. A refrigerant which changes phase requires relatively little storage space.

According to a preferred embodiment of the invention, the control unit is adapted to receiving information from a sensor which monitors a parameter related to the position of a brake control in the vehicle and, when the brake control is in a position which indicates that the vehicle is to be braked, to connecting the cooling system to the vehicle's power train. Such a brake control may be a control by which a driver initiates an automatic braking process of the vehicle to achieve a desired constant speed downhill. Heavy vehicles usually have one or more supplementary brakes by which they are braked downhill to prevent wear on and overloading of their wheel brakes. In this case the cooling system may replace such a supplementary brake. The brake control may alternatively be a conventional brake pedal.

According to a preferred embodiment of the invention, the control unit is adapted to receiving information from a sensor which monitors a parameter related to the position of an acceleration control of the vehicle and, when the acceleration control is in a position which indicates that the vehicle requires extra propulsive force, to using the cooled refrigerant to cool the working medium in the line circuit downstream of the condenser. The acceleration control may be a conventional accelerator pedal. An indication that the vehicle requires extra propulsive force may be the accelerator pedal being depressed all the way or to a position close to all the way. This may happen when the vehicle reaches an upgrade.

According to a preferred embodiment of the invention, the cooling system comprises a compressor which the control unit is adapted to connecting to the power train at times when the vehicle is to be braked. A compressor cooling system is the commonest kind of cooling system in which a cooling medium can be cooled to a lower temperature than that of the surroundings. Such a cooling system comprises not only the compressor but also a condenser, an expansion valve and an evaporator. When it is driven by the power train, the compressor compresses the cooling medium in the cooling system. This counteracts the power train's motion so that the vehicle is braked. At the same time, the cooling medium in the evaporator may cool the refrigerant to a low temperature level. The compressor may be a component of an AC system of the vehicle which has an extra line portion with an extra evaporator to cool the refrigerant. Most vehicles have an AC system to cool the air in a cab space in which the environment is at a high temperature. The AC system will comprise an existing compressor which can be used for this purpose. Alternatively, a separate compressor cooling system or some other kind of cooling system may be used.

With advantage, the working medium absorbs thermal energy in an evaporator from exhaust gases in an exhaust line of a combustion engine. The exhaust gases from a combustion engine are a very good heat source having a high temperature which is normally lost to the surroundings. The working medium may also absorb thermal energy from exhaust gases recirculated in a return line to the engine. Recirculating exhaust gases are normally cooled in at least one EGR cooler before they are led to the engine. In this case the recirculating exhaust gases undergo effective cooling while at the same time part of their thermal energy may be converted to mechanical energy.

BRIEF DESCRIPTION OF THE DRAWINGS

Preferred embodiments of the invention are described below by way of examples with reference to the attached drawings, in which.

DETAILED DESCRIPTION OF PREFERRED EMBODIMENTS OF THE INVENTION

Figure 1:
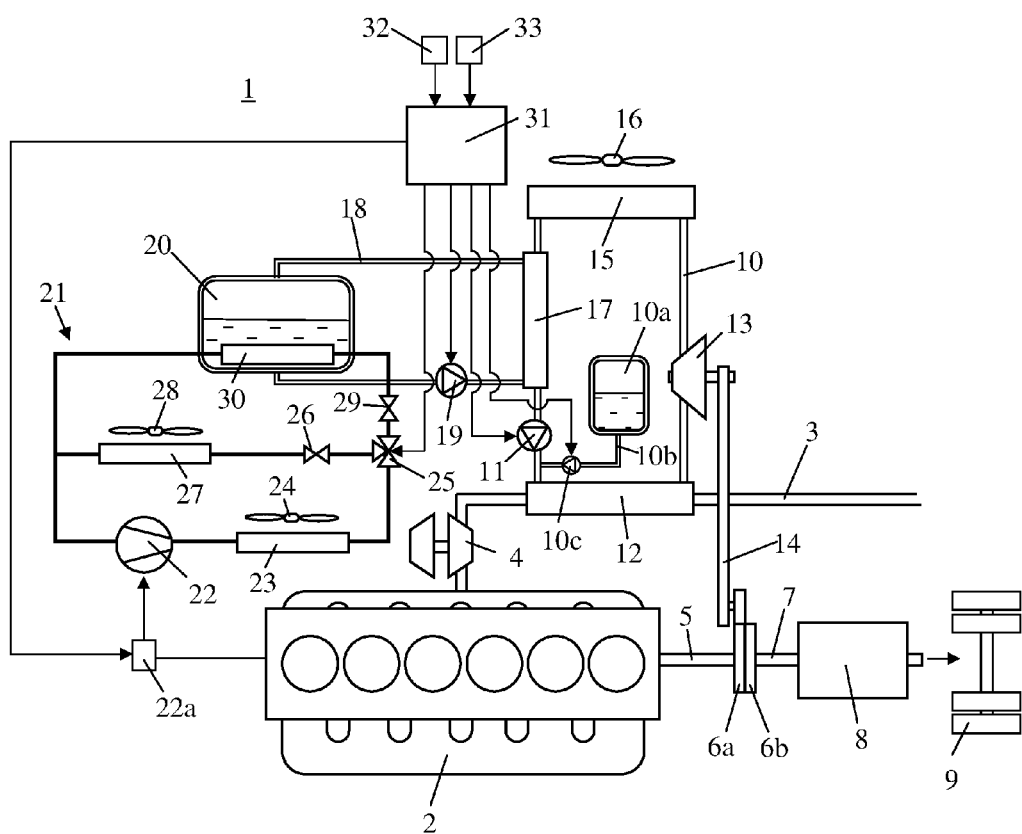
FIG. 1 depicts an arrangement for conversion of thermal energy to mechanical energy according to a first embodiment of the invention and FIG. 2 depicts an arrangement for conversion of thermal energy to mechanical energy according to a second embodiment of the invention.

FIG. 1 depicts an arrangement for conversion of thermal energy to mechanical energy in a schematically depicted vehicle 1 powered by a supercharged combustion engine 2. The vehicle 1 may be a heavy vehicle powered by a supercharged diesel engine. The exhaust gases from the engine's cylinders are led to an exhaust line 3 which comprises a turbine 4 in a turbo unit. The vehicle has a power train starting with the combustion engine 2, a shaft 5, a flywheel 6a, a clutch 6b, a shaft 7, a gearbox 8 etc. The power train ends with a pair of powered wheels 9. The power train rotates as a unit when the clutch 6b is engaged.

The vehicle is equipped with an arrangement for recovery of thermal energy. The arrangement may be referred to as a WHR (waste heat recovery) system and comprises a line circuit 10 with a pump 11 adapted to circulating and pressurising a working medium in the line circuit. The working medium is led from the pump 11 to an evaporator 12 in which it is warmed by exhaust gases in the exhaust line 3 at a location downstream of the turbine 4. The working medium is warmed in the evaporator 12 to a temperature at which it vaporises and is extra-heated. The extra-heated and gaseous working medium is led from the evaporator 12 to a turbine 13 in which it expands. The turbine 13 is thus provided with rotary motion which is transferred to the flywheel 6a in the power train via a mechanical transmission 14. The rotary motion of the turbine 13 provides the vehicle 1 with extra propulsive force. The mechanical transmission 14 may comprise a number of motion-transmitting elements in the form of toothed gears or the like so that the rotary motion of the turbine 13 undergoes appropriate ratio stepdown before it is transferred to the flywheel 6a. Alternatively, the turbine 13 may be connected to a flywheel or similar mechanical energy storage unit which is connectable to the vehicle's power train. When the flywheel is connected to the power train, the vehicle is provided with extra propulsive force. According to a further alternative the turbine 13 may drive a generator which converts the mechanical energy to electrical energy. The electrical energy may be stored in an energy store. The electrical energy stored in the energy store may at appropriate times be used for operation of the vehicle.

Exhaust gases from a combustion engine 2 are a very good heat source for recovery of thermal energy. In this case the evaporator 12 is situated in the exhaust line 3 at a location downstream of the turbine 4. The temperature of the exhaust gases downstream of the turbine 4 may be of the order of 200-300° C. The evaporator 12 may alternatively be situated in an exhaust line for recirculating exhaust gases. The exhaust gases are usually recirculated from a location upstream of the turbine 4 in the exhaust line 3, in which case they may be at a temperature of about 600-700° C. However, the working media used in WHR systems have an upper temperature which should not be exceeded. With suitable dimensioning of the evaporator 12, the working medium used may vaporise and be extra-heated at a suitably high temperature.

When the gaseous working medium has expanded in the turbine 13, it assumes a lower pressure and a lower temperature. It is led from the turbine 13 to a condenser 15 which in this case is air-cooled. The condenser 15 may be situated at a front surface of the vehicle where the working medium is cooled by air at the temperature of the surroundings. A cooling fan 16 draws the air through the condenser 15. When it is cooled in the condenser 15, the gaseous working medium condenses. The resulting liquid working medium is led from the condenser 15 to a heat exchanger 17. The heat exchanger 17 is a component of a radiator arrangement which is capable of cooling the working medium after it has been cooled in the condenser 15. The working medium is cooled in the heat exchanger 17 by a refrigerant which is at a lower temperature than that of the surroundings at times when the vehicle requires extra propulsive force. In this case the refrigerant is a cold coolant. The coolant is circulated in a coolant circuit 18 by a pump 19. The coolant may take the form of a mixture of water and glycol. Coolants comprising 50 percent water and 50 percent glycol may go down to a temperature of about −40° C. without freezing. The coolant circuit 18 comprises an accumulator tank 20 for storage of cold coolant. In cases where the vehicle needs extra propulsive force and there is cold coolant available, the amount of working medium in the line circuit 10 also needs adjusting. The line circuit 10 is connected to a storage tank 10a for the working medium which at the time is not being used in the line circuit. The storage tank 10a is connected to the line circuit 10 by a line 10b which comprises a reversible pump 10c. The amount of working medium in the line circuit 10 may be adjusted by activating the pump 10c in the appropriate direction. The amount is in this case adjusted so that only a small proportion or none of the condensation takes place in the condenser 15. The working medium thus changes to liquid phase mainly in the heat exchanger 17. The condensation temperature may thus be lowered.

The arrangement comprises part of an AC system 21 for cooling the air in a cab space of the vehicle 1. The AC system 21 comprises a compressor 22 driven by the engine 2 by means of a driving belt or the like. The compressor 22 is activated by means of a schematically depicted clutch mechanism 22a which establishes driving connection between the compressor and the engine. When the compressor is in operation, it compresses and circulates a cooling medium in the AC system 21. The cooling medium is led from the compressor 22 to a condenser 23 which is situated at a front surface of the vehicle and in which the cooling medium is cooled by air at the temperature of the surroundings. The air is drawn through the condenser 23 by a cooling fan 24 and the draught created by the vehicle's forward movement. The cooling medium is cooled in the condenser 23 to a temperature at which it condenses. The liquid cooling medium is led from the condenser 23 to a three-way valve 25 by which the cooling medium can be directed through two alternative line portions.

When the three-way valve 25 is put into a first position, the cooling medium is led through a first line portion which comprises a first expansion valve 26 and a first evaporator 27. When the cooling medium passes through the first expansion valve 26, its pressure and temperature both drop. The cold cooling medium is then led to the first evaporator 27 in which it cools the air in a cab space of the vehicle. The air is forced through the first evaporator 27 by a fan 28. The cooling medium is warmed by the air to a temperature at which it vaporises in the first evaporator 27. The gaseous cooling medium is then led back to the compressor 22. When the three-way valve 25 is put into a second position, the cooling medium is led through a second line portion which comprises a second expansion valve 29 and a second evaporator 30 which is situated inside the accumulator tank 20. When the cooling medium passes through the second expansion valve 29, its pressure and temperature both drop. The cold cooling medium is then led to the second evaporator 30 in which it cools the coolant stored in the accumulator tank 20. The cold cooling medium is warmed by the coolant in the accumulator tank 20 so that it vaporises in the second evaporator 30. The vaporised cooling medium is then led back to the compressor 22.

The system comprises a control unit 31 adapted to controlling the activation of the pump 11 which circulates the working medium in the line circuit 10, and the pump 10c which adjusts the amount of working medium in the line circuit 10. The control unit 31 is also adapted to receiving information from a sensor 32 which monitors the position of an accelerator pedal, and from a sensor 33 which monitors the position of a brake control. The brake control 33 is in this case a control by which a driver initiates an automatic braking process to provide the vehicle with a desired constant speed downhill. The brake control may alternatively be a conventional brake pedal. The control unit 31 is capable of controlling the arrangement by means of the pump 11 in the line circuit 10, the pump 10c in the line 10b, the pump 19 in the coolant circuit 18 and the three-way valve 25. The control unit 31 may be a computer unit with suitable software for this purpose.

After starting of the engine 2, exhaust gases are led out through the exhaust line 3. When the exhaust gases in the exhaust line 3 reach a suitable temperature, the control unit 31 activates the pump 11 to begin circulating the working medium in the line circuit 10. The working medium is warmed in the evaporator 12 by exhaust gases in the exhaust line 3 so that it vaporises and is extra-heated. The working medium is extra-heated to a temperature in the evaporator 12 which is related to the temperature and flow of the exhaust gases in the exhaust line 3. The extra-heated working medium expands through the turbine 13. The turbine 13 thus acquires a rotary motion which is transferred, via the mechanical transmission 14, to the flywheel 6a in the power train. Part of the thermal energy in the exhaust gases is here converted by the turbine 13 to mechanical energy for operation of the vehicle.

The medium is then led to the condenser 15 in which it is cooled by air at the temperature of the surroundings. The working medium condenses in the condenser 15 at a condensation temperature which depends on the temperature and flow of the surrounding air through the condenser. Surrounding air at a high temperature results in a higher condensation temperature than surrounding air at a lower temperature. The control unit 31 controls the pump 10c so that a suitable amount of working medium is circulated in the line circuit 10 in prevailing circumstances. The resulting power output in the turbine 13 is largely determined by the difference between the extra-heating temperature of the working medium when it is led into the turbine 13 and its condensation temperature in the condenser 15. The fact that the temperature and flow of the exhaust gases vary with the engine's load and that the condensation temperature varies with the temperature of the surroundings means that the turbine's production of mechanical energy varies considerably.

At times when the control unit 31 receives information that the driver has released the accelerator pedal 32, it halts the operation of the pump 11 in the line circuit 10. This means that the arrangement does not impart any unwanted propulsive force to the vehicle. If at the same time it receives information that the driver has activated the brake control 33, the control unit 31 activates the clutch mechanism 22a to establish a driving connection between the compressor 22 and the engine 2. At times when the vehicle is travelling downhill, its powered wheels 9 impart driving motion to the power train and thereby to the engine. The compressor 22 is then driven by the engine. The vehicle's kinetic energy downhill is here converted via the power train to operation of the compressor 22. The work which the compressor 22 performs in compressing the cooling medium in the AC system serves as a braking force which counteracts the motion of the powered wheels 9. The compressor serves in this case as a supplementary brake. If its braking effect is not sufficient to maintain the desired speed downhill, other supplementary brakes of the vehicle may be activated. At the same time as the brake control 33 is activated, the control unit 31 puts the three-way valve 25 into the second position so that at least part of the cooling medium in the AC system 21 is led through the second line portion comprising the second expansion valve 29 and the second evaporator 30. The cooling medium led through the second evaporator 30 cools the coolant in the accumulator tank 20 to a low temperature which is with advantage considerably lower than the temperature of the surrounding air. In this case the vehicle's kinetic energy downhill is thus used to cool the cooling medium in the accumulator tank 20.

When the control unit 31 receives information that the driver wishes to end the automatic braking process, or when the coolant has been cooled to a low enough storage temperature in the accumulator tank, the control unit 31 puts the three-way valve 25 into the first position. The control unit 31 also switches off the compressor 22 if the AC system is not intended to be in operation and cool the air in the cab space. On a long hill, the coolant will then have been cooled to a significantly lower temperature than that of the surrounding air in the accumulator tank 20. The accumulator tank 20 may be thermally insulated to enable the coolant to maintain its low temperature in the accumulator tank 20 for a relatively long time.

When the control unit 31 receives information that the accelerator pedal 32 has been depressed again, the driver wishes to impart propulsive force to the vehicle. The control unit 31 activates the pump 11 so that the working medium is circulated in the line circuit 10. The arrangement begins again the process of converting thermal energy in the exhaust gases to mechanical energy for operation of the vehicle. If the control unit 31 receives information from the sensor 32 that the accelerator pedal 32 is depressed to or nearly to its maximum, the driver desires extra propulsive force from the vehicle. The vehicle may then have reached an upgrade. The control unit 31 activates the pump 19 in the coolant circuit 18 so that cold coolant is circulated from the accumulator tank 20 to the heat exchanger 17 in which it cools the working medium in the line circuit 10. The working medium thus undergoes not only cooling in the condenser 15 but also extra cooling by the cold coolant in the heat exchanger 17. At the same time, the control unit 31 activates the reversible pump 10c so that the amount of working medium in the line circuit 10 is adjusted to an optimum level. Such extra cooling of the working medium by coolant which is at a lower temperature than surrounding air combines with suitable adjustment of the amount of working medium in the line circuit to cause the condensation temperature to drop. The amount of working medium in the line circuit 10 is adjusted to a level such that the working medium undergoes no or substantially no extra cooling after it has condensed in the heat exchanger 17. This means that no thermal energy from the exhaust gases need be used to warm the working medium to the vaporisation temperature and that substantially all of the thermal energy from the exhaust gases can be used for vaporising the working medium in the evaporator 12. In this case an optimum amount of thermal energy may be converted to mechanical energy in the turbine 9.

As the engine is under heavy load when the vehicle travels uphill, the warm exhaust gases in the exhaust line provide the working medium with very good warming so that it vaporises and is extra-heated to a high temperature. This means that the turbine 13 generates more mechanical energy than when there is less load upon the engine. The extra cooling of the working medium in the heat exchanger 17 combines with the adjustment of the amount of working medium in the line circuit 10 to lower the condensation temperature and enable the turbine 13 to generate a larger amount of mechanical energy for operation of the vehicle. The arrangement can thus store energy when the vehicle is travelling downhill, and use the stored energy when travelling uphill. The arrangement thus acquires more capacity than a conventional WHR system. In this case a compressor 22 in an existing AC system is used to brake the vehicle on downhill runs. The compressor 22 may therefore need to be provided with more capacity than a conventional compressor in an AC system.

Figure 2:
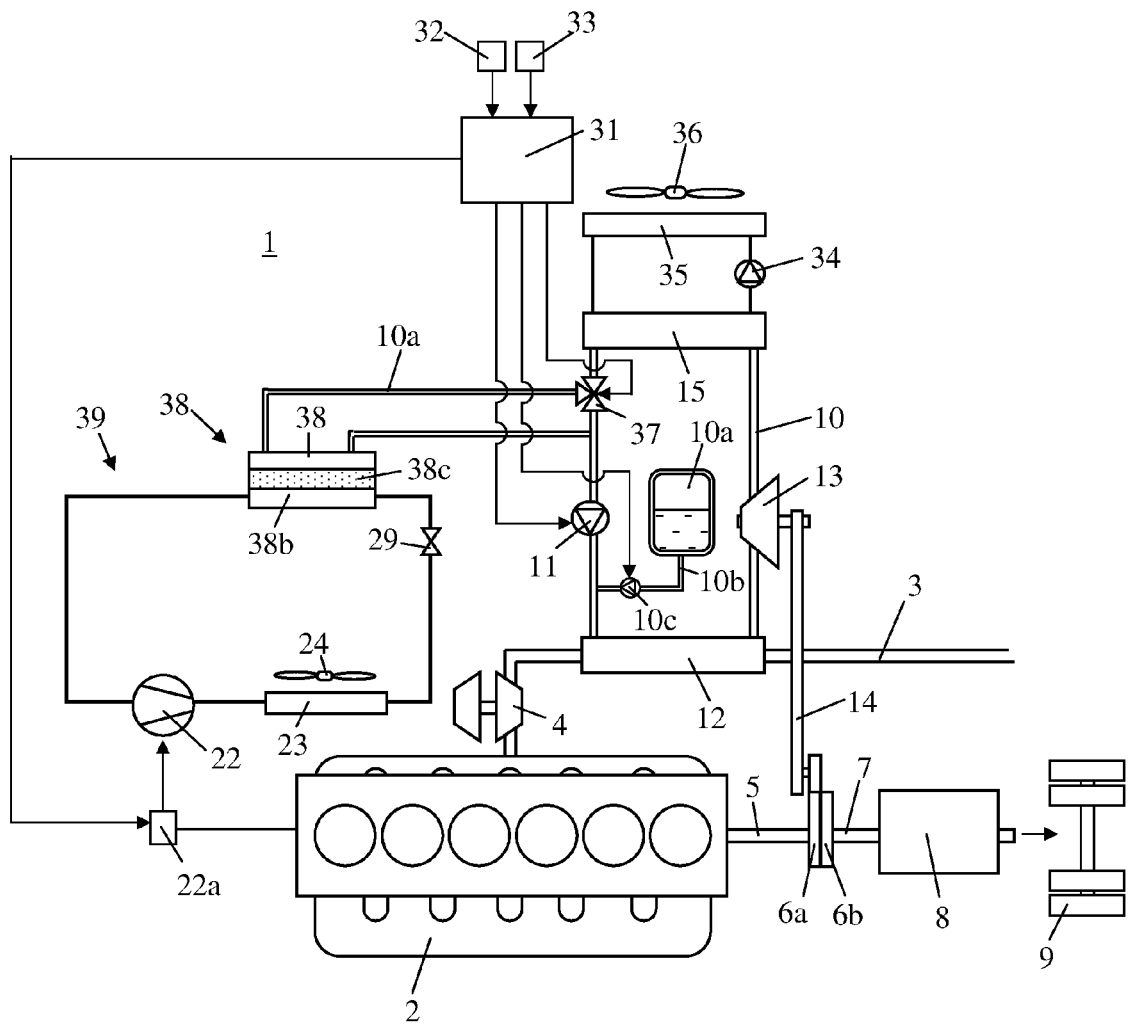

FIG. 2 depicts an alternative embodiment of the arrangement. Here again the arrangement comprises a line circuit 10 with a working medium which is circulated by a pump 11. The amount of working medium in the line circuit 10 is adjusted by means of a reversible pump 10c situated in a line 10b which connects the line circuit 10 to a storage tank 10a. The working medium is warmed in an evaporator 12 by the exhaust gases in an exhaust line 3 of a combustion engine 2. The evaporator 12 is situated in the exhaust line 3 at a location downstream of a turbine 4 of a turbine unit. The working medium which vaporises in the evaporator 12 is led to a turbine 13. After it has expanded through the turbine 13, the gaseous working medium is led to a condenser 15 in which it is cooled by a coolant which circulates in a low-temperature cooling circuit. A pump 34 circulates the coolant in the low-temperature cooling circuit. The coolant is cooled in an air-cooled radiator 35 at a front portion of the vehicle by air at the temperature of the surroundings which is forced through the radiator by a cooling fan 36. In this case the working medium is cooled in the condenser 15 by coolant which is at a temperature close to that of surrounding air. The line circuit 10 comprises in this case a three-way valve 37 situated at a location downstream of the condenser 15. When this valve is put into a first position, it directs the working medium which has been cooled in the condenser 15 to the pump 11. When the valve 37 is put into a second position, it directs the working medium which has been cooled in the condenser 15 to an alternative line portion 10a which comprises a heat exchanger 38 for three media. The working medium is cooled in a first portion 38a of this heat exchanger. The working medium is then led to the ordinary line circuit 10 at a location upstream of the evaporator 12.

The heat exchanger 38 comprises a second portion 38b in the form of an evaporator for the cooling medium in a cooling system 39 of the vehicle. The cooling system comprises a compressor 22 driven by the engine 2. The compressor 22 is connected to the engine by a schematically depicted clutch mechanism 22a. When the compressor is in operation, it compresses and circulates a cooling medium in the cooling system 39. The cooling medium is led from the compressor 22 to a condenser 23 in which it is cooled by air which is with advantage at the temperature of the surroundings. The air is drawn through the condenser 23 by a cooling fan 24. The cooling medium is led from the condenser 23 to an expansion valve 29. The cooling medium assumes a lowered pressure and a lowered temperature by passing through the expansion valve 29. It is then led to the heat exchanger's second portion 38b in which it vaporises. When the cooling medium vaporises in the heat exchanger's second portion 38b, it cools a refrigerant which is situated in an intermediate portion 38c of the heat exchanger 38.

The refrigerant in the heat exchanger's intermediate portion 38c comprises material which changes from liquid phase to solid phase when it is cooled by the cooling medium in the second portion 38b. The refrigerant has with advantage a high latent heat storage capacity per unit weight or volume. This means that the intermediate portion 38c may be relatively small. When the coolant medium has vaporised in the evaporator 38b, it is led back to the compressor 22. The arrangement comprises a control unit 31 which controls the activation of the pump 11 and the three-way valve 37 in the line circuit 10. The control unit 31 controls also the activation of the compressor 22 in the cooling system 39. The control unit 31 receives information substantially continuously from a sensor 32 which monitors the position of an accelerator pedal of the vehicle, and from a sensor 33 which monitors the position of a brake control of the vehicle. The brake control is a control by which a driver initiates an automatic braking process of the vehicle downhill.

During operation of the engine 2, exhaust gases are led through the exhaust line 3. When the control unit 31 receives signals from the sensor 32 that the accelerator pedal is depressed, it activates the pump 11 so that the working medium is circulated in the line circuit 10, and the pump 10c so that the line circuit 10 is supplied with a suitable amount of working medium. At the same time, the control unit 31 puts the three-way valve 37 into the first position. The circulating working medium is cooled in the condenser 15 by the coolant in the low-temperature cooling system. When the coolant is at a low temperature, the working medium condenses in the condenser 15 at a relatively low condensation temperature. The condensation temperature here is higher than the temperature of the surroundings. The liquid working medium is led from the condenser 15 to the evaporator 12 via the three-way valve 37 and the pump 11. The working medium is warmed by the warm exhaust gases in the exhaust line 3 so that it vaporises and is extra-heated. The extra-heated working medium is led to the turbine 13, in which it expands. The turbine 13 thus acquires a rotary motion which is transferred, via the mechanical transmission 14, to the flywheel 6a in the vehicle's power train. In this operating state, both the engine 2 and the arrangement impart propulsive force to the vehicle.

At times when it receives information from the sensor 32 that the accelerator pedal 32 has been fully released, the control unit 31 halts the operation of the pump 11 in the line circuit 10, since the driver does not wish to impart any propulsive force to the vehicle. If at the same time it receives information from the sensor 33 that the driver has activated the brake control which gives the vehicle a constant speed downhill, the control unit 31 activates the clutch mechanism 22a which connects the compressor 22 to the engine 2. When the vehicle is rolling downhill, driving torque is transferred from its power train to the compressor 22. The compressor uses this energy to compress the cooling medium in the cooling system. This compression of the cooling medium counteracts the power train's motion so that the vehicle is braked. The compressor thus serves as a supplementary brake for the vehicle. The cooling medium in the cooling system 39 is led via the expansion valve 29 to the heat exchanger's second portion 38b. When the cooling medium vaporises in the second portion 38b, the refrigerant in the intermediate portion 38c is cooled. When the refrigerant is cooled, it changes from liquid to solid phase. The temperature at which the refrigerant changes phase is with advantage lower than that of the surrounding air.

When it receives information from the sensor 33 that the brake control has been put into a non-braking position, the control unit 31 halts the operation of the compressor 22 by means of the clutch mechanism 22a. When the control unit 31 receives information from the sensor 32 that the accelerator 32 is again depressed, the driver wishes to impart propulsive force to the vehicle. The control unit 31 activates the pump 11 so that the working medium again circulates in the line circuit 10, and the pump 10c so that the line circuit 10 is supplied with a suitable amount of working medium. The arrangement begins again the process of converting thermal energy in the exhaust gases to mechanical energy for operation of the vehicle. If the control unit 31 receives information from the sensor 32 that the accelerator pedal 32 is depressed to or nearly to its lowest possible position, the driver wishes to obtain more propulsive force from the vehicle, which may be the case when it approaches an upgrade. The control unit 31 puts the three-way valve 37 into the second position. The working medium which has undergone a first step of cooling in the condenser 15 is then led into the alternative line portion 10a. The working medium is cooled in the heat exchanger's first portion 38a by the refrigerant in the intermediate portion 38c. The working medium thus undergoes extra cooling before being led back to the ordinary line circuit 10 at a location upstream of the evaporator 12. Such extra cooling of the working medium by a refrigerant which is at a lower temperature than surrounding air causes the condensation temperature of the working medium to drop in the line circuit 10. In favourable circumstances, the working medium condenses only in the heat exchanger 17. This may result in a lower condensation temperature than the temperature of the surroundings.

The medium is then led to the evaporator 12, in which it is warmed by the warm exhaust gases so that it vaporises and is extra-heated. The fact that in this case the working medium has an extra low condensation temperature enables it to undergo expansion in the turbine 13, thereby generating much extra mechanical energy for operation of the vehicle. This further increased amount of mechanical energy is related to how much the condensation temperature is lowered. In this case a compressor 22 in a separate cooling system is used to cool a refrigerant when the vehicle is travelling downhill. The cooled cooling medium is stored in a storage space in the form of the heat exchanger's intermediate portion 38c. The cold refrigerant is used at subsequent times when the vehicle requires extra propulsive force, which may be when it is travelling uphill.

The invention is in no way restricted to the embodiment to which the drawing refers, but may be varied freely within the scopes of the claims.

The invention claimed is:

1. An arrangement in a vehicle for converting thermal energy to mechanical energy, the arrangement comprising:
   a line circuit including a pump therein for circulating a working medium in the line circuit;
   an evaporator at the line circuit and in which the working medium absorbs thermal energy from a heat source so that the working medium vaporises;
   a turbine downstream in the line circuit from the evaporator and the turbine is located and configured to being driven by the vaporised working medium for generating mechanical energy;
   a first condenser downstream of the turbine and configured for cooling the working medium so that the working medium condenses;
   a cooling system connectable to a power train of the vehicle which includes an engine of the vehicle;
   a control unit configured for receiving information which indicates when the vehicle is to be braked and, when such information is received by the control unit, the control unit is configured to connect the cooling system to the vehicle power train such that the cooling system is configured to cool a refrigerant in the cooling system to a lower temperature than a temperature of surroundings of the vehicle; and
   the control unit is also configured for receiving information which indicates when the vehicle requires extra propulsive force and, when the vehicle requires extra propulsive force, the control unit is configured for directing the cooled refrigerant to subject the working medium in the line circuit to a second step of cooling at a location downstream of the condenser and before the working fluid is led to the evaporator.

2. An arrangement according to claim 1, further comprising a storage space for storing cooled refrigerant which has been cooled by the cooling system.

3. An arrangement according to claim 2, further comprising:
   a heat exchanger located downstream of the condenser in the line circuit;
   a refrigerant circuit extending between the storage space and the heat exchanger; and
   a pump configured to being activated by the control unit to circulate the cold refrigerant from the storage space to the heat exchanger where the heat exchanger is configured to cool the working medium at times when the vehicle is to be provided with extra propulsive force.

4. An arrangement according to claim 2, further comprising:
   a valve at a location downstream of the condenser in the line circuit, an extra line loop between the valve and the storage space;
   the control unit is configured for putting the valve into a position in which the working medium is directed from the valve to the storage space where the working medium is cooled by the cold refrigerant when the vehicle is to be provided with extra propulsive force.

5. An arrangement according to claim 1, wherein the refrigerant comprises a mixture of water and glycol.

6. An arrangement according to claim 1, wherein the refrigerant comprises a material which changes phase from liquid state to solid state in the storage space when the refrigerant is cooled by the cooling system.

7. An arrangement according to claim 1, further comprising:
   a brake control of the vehicle;
   a sensor configured to monitor a parameter related to the position of the brake control; and
   the control unit is configured to receive information from the sensor and, when the brake control is sensed to be in a position which indicates braking of the vehicle, the control unit connecting the cooling system to the vehicle's power train so that the cooling system is driven by the vehicle's kinetic energy.

8. An arrangement according to claim 1, further comprising:
   an acceleration control of the vehicle;
   a sensor configured to monitor a parameter related to the position of the acceleration control;
   the control unit is configured to receive information from the sensor and, when the acceleration control is sensed to be in a position which indicates that the vehicle requires extra propulsive force, the control unit causing use of the cooled refrigerant to cool the working medium in the line circuit downstream of the condenser.

9. An arrangement according to claim 1, wherein the cooling system comprises a compressor and the control unit is configured to connecting the compressor to the vehicle's power train at times when the vehicle is to be braked.

10. An arrangement according to claim 9, wherein the compressor comprises a component of an AC system of the vehicle and the component of the AC system has a line portion with an extra evaporator for cooling the refrigerant.

* * * * *